US009380741B2

(12) United States Patent
Drew et al.

(10) Patent No.: US 9,380,741 B2
(45) Date of Patent: Jul. 5, 2016

(54) YARD MAINTENANCE VEHICLE ROUTE AND ORIENTATION MAPPING SYSTEM

(75) Inventors: Bernard Drew, Savannah, GA (US); Sean Dwyer, Gastonia, NC (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/368,116

(22) PCT Filed: Dec. 28, 2011

(86) PCT No.: PCT/US2011/067458
§ 371 (c)(1),
(2), (4) Date: Jun. 23, 2014

(87) PCT Pub. No.: WO2013/100925
PCT Pub. Date: Jul. 4, 2013

(65) Prior Publication Data
US 2014/0371979 A1    Dec. 18, 2014

(51) Int. Cl.
*A01D 34/00* (2006.01)
*G01C 21/34* (2006.01)
*A01B 79/00* (2006.01)
*G07C 5/00* (2006.01)
*G07C 5/08* (2006.01)
(Continued)

(52) U.S. Cl.
CPC ............ *A01D 34/006* (2013.01); *A01B 79/005* (2013.01); *G01C 21/3407* (2013.01); *G01C 21/3667* (2013.01); *G01C 21/3697* (2013.01); *G06Q 20/14* (2013.01); *G07C 5/008* (2013.01); *G07C 5/08* (2013.01)

(58) Field of Classification Search
CPC .... A01D 34/006; A01B 79/005; G07C 5/008; G07C 5/08; G07C 21/3407; G07C 21/3667; G07C 21/3697; G06Q 20/14
USPC ........................................................ 701/32.3
See application file for complete search history.

(56) References Cited

U.S. PATENT DOCUMENTS 5,366,376 A * 11/1994 Copperman .......... A63F 13/005
                                                  273/148 B
5,928,309 A    7/1999 Korver et al.
6,611,738 B2   8/2003 Ruffner
(Continued)

FOREIGN PATENT DOCUMENTS

EP    1674324 A1    6/2006

OTHER PUBLICATIONS

International Preliminary Report on Patentability of PCT/US2011/067458 issued on Jul. 1, 2014, all enclosed pages cited.
(Continued)

*Primary Examiner* — Richard Camby
(74) *Attorney, Agent, or Firm* — Nelson Mullins Riley & Scarborough LLP

(57) ABSTRACT

A riding yard maintenance vehicle may include a positioning module. The positioning module may be configured to store position information indicative of a position history of the vehicle responsive to operation of the vehicle defining a route. The positioning module may include a user interface, a memory for storing data received via one or more sensors, and processing circuitry in communication with the user interface and the memory. The processing circuitry may be configured to control operation of the positioning module and generate feedback via the user interface. The feedback may be provided to an operator based on the position information.

19 Claims, 10 Drawing Sheets

(51) Int. Cl.
*G01C 21/36* (2006.01)
*G06Q 20/14* (2012.01)

(56) References Cited

U.S. PATENT DOCUMENTS

| | | |
|---|---|---|
| 6,876,920 B1 | 4/2005 | Mailer |
| 7,076,348 B2 | 7/2006 | Bucher et al. |
| 7,099,774 B2 | 8/2006 | King et al. |
| 7,110,881 B2 | 9/2006 | Gray et al. |
| 7,756,624 B2 * | 7/2010 | Diekhans et al. ............ 701/50 |
| 7,979,174 B2 * | 7/2011 | Fregene et al. ............ 701/23 |
| 8,204,654 B2 * | 6/2012 | Sachs et al. ............ 701/50 |
| 2004/0193348 A1 | 9/2004 | Gray et al. |
| 2005/0217230 A1 | 10/2005 | Bucher |
| 2006/0175541 A1 | 8/2006 | Eglington et al. |

OTHER PUBLICATIONS

International Search Report and Written Opinion of PCT/US2011/067458 mailed on May 3, 2012, all enclosed pages cited.

"GPS Mower Tracker Device," printed on Aug. 22, 2011 from http://www.trackersystems.net/GPS-Tracking-Products/save-insurance-costs-lawn-mower-equipment.html, all enclosed pages cited.

* cited by examiner

YARD MAINTENANCE VEHICLE ROUTE AND ORIENTATION MAPPING SYSTEM

TECHNICAL FIELD

Example embodiments generally relate to yard maintenance vehicles and, more particularly, relate to a riding yard maintenance vehicle having equipment configurable to facilitate the collection of route data while the yard maintenance vehicle performs a task. The route data may then, in some cases, be analyzed to determine optimal routing information and/or display feedback on the route for display or output to a user.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers and/or the like) in addition to grass cutting components. Riding lawn mowers provide the convenience of a riding vehicle as well as a typically larger cutting deck as compared to a walk-behind model.

Riding lawn mowers are typically capable of transiting over even and uneven terrain to execute yard maintenance activities of various types (e.g., lawn mowing, tilling, brush cutting, mulching, etc.). Regardless of the specific operating environment, riding yard maintenance vehicles are often engaged in activities that their riders may wish to track or monitor either for cost considerations or purely for the sake of interest. For example, vehicle owners may simply want to know how long it takes them to complete a certain task, or how much fuel is consumed in connection with the performance of certain regular maintenance activities. These and other types of information tracking have typically been performed manually in the past using log books or mental notes. However, as computing devices become more ubiquitous, it is to be expected that they may be employed to assist in tracking such information. For example, users may build spreadsheets or other computer trackable records using logged data that they manually transfer into a computer. Even this level of assistance may still not be satisfying to some users.

BRIEF SUMMARY OF SOME EXAMPLES

Some example embodiments may therefore provide a riding yard maintenance vehicle having an onboard vehicle positioning module that may include, for example, a global positioning system (GPS) receiver and an accelerometer so that information regarding vehicle positioning and orientation (e.g., speed, latitude, longitude, time, date, acceleration/direction, pitch angle, yaw angle, roll angle and/or the like) may be obtained and recorded. Processing circuitry including a storage device for storing the information and a processor for processing the information may then be employed to analyze the data and provide feedback to the operator of the vehicle regarding the route and/or conditions created during operation of the vehicle.

In one example embodiment, a riding yard maintenance vehicle is provided. The riding yard maintenance vehicle may include a positioning module. The positioning module may be configured to store position information indicative of a position history of the vehicle responsive to operation of the vehicle defining a route. The positioning module may include a user interface, a memory for storing data received via one or more sensors, and processing circuitry in communication with the user interface and the memory. The processing circuitry may be configured to control operation of the positioning module and generate feedback via the user interface. The feedback may be provided to an operator based on the position information.

In another example embodiment, a positioning module configured to process position information indicative of a position history of a riding yard maintenance vehicle is provided. The positioning module may include a user interface, a memory for storing data received via one or more sensors of the vehicle, and processing circuitry in communication with the user interface and the memory. The processing circuitry may be configured to control operation of the positioning module and generate feedback via the user interface. The feedback may be provided to an operator based on the position information.

In another example embodiment, a method is provided. The method may include receiving information indicative of vehicle position and orientation of a riding yard maintenance vehicle, generating route information based on the information received to define a current route, and providing feedback to the operator based on information associated with the current route.

Some example embodiments may improve the ability of operators and/or fleet managers to monitor and/or record information regarding the operation of a riding yard maintenance vehicle.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1A:
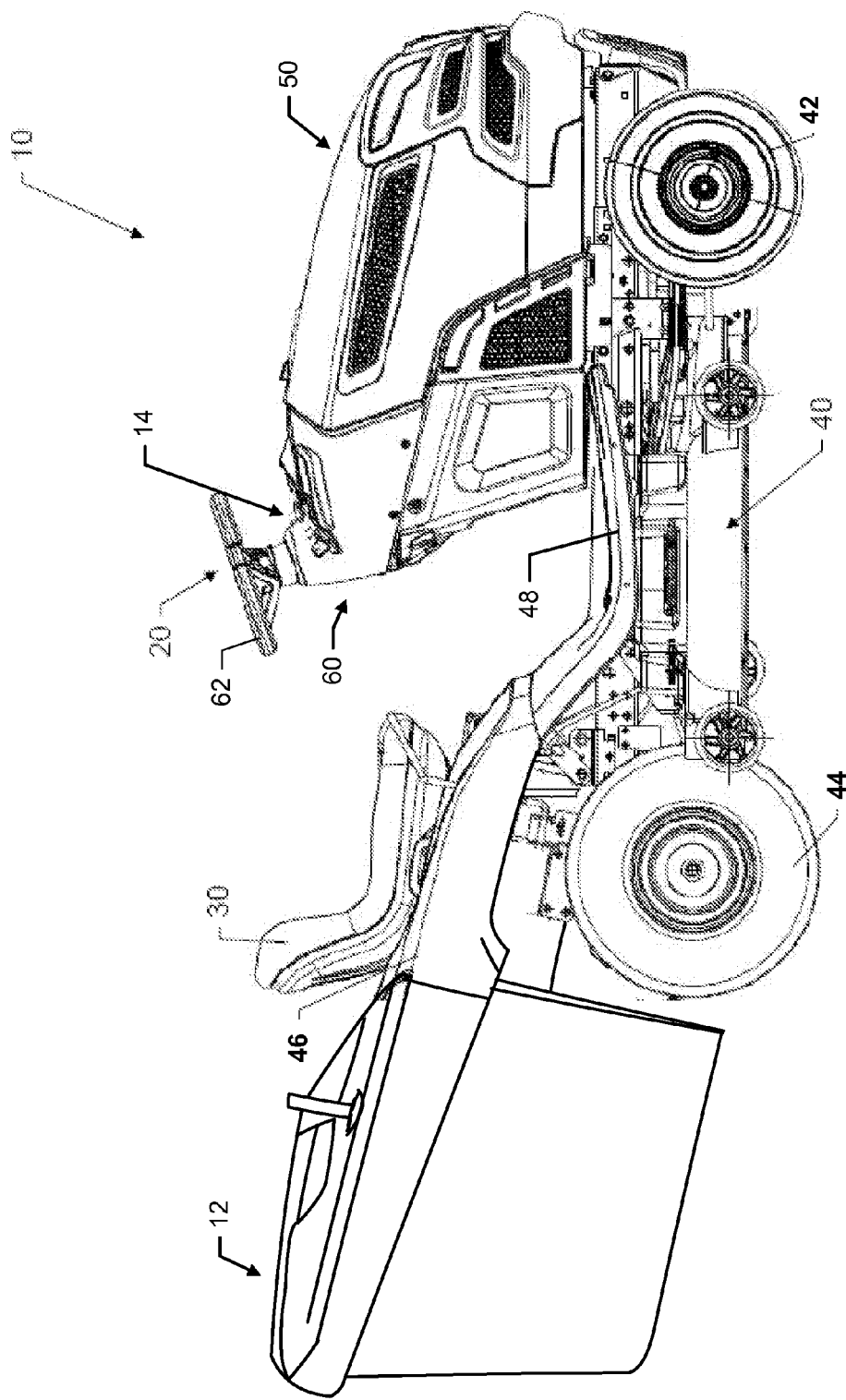
FIG. 1A illustrates a side view of a riding yard maintenance vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "yard maintenance" is meant to relate to any outdoor grounds improvement or maintenance related activity and need not specifically apply to activities directly tied to grass, turf or sod care. As used herein, operable coupling should be understood to relate to direct or indirect connection that, in either case, enables functional interconnection of components that are operably coupled to each other.

In an example embodiment, a riding yard maintenance vehicle is provided with an onboard positioning module configured to enable data related to position and/or orientation information regarding the vehicle to be tracked and/or recorded. The position and/or orientation information may then be stored and/or processed (e.g., by onboard or remote processing and storage equipment) to provide the operator of the riding yard maintenance vehicle (or others) with feedback relating to the route or conditions encountered during operation of the vehicle. In some cases, the riding yard maintenance vehicle may be equipped to display, record and/or report information related to the operation of the riding yard maintenance vehicle to the operator in real-time. The operator (or others) may therefore be enabled to recognize certain conditions that should be avoided, drive in accordance with a recommended or optimal route, provide proof of performance or execution, and/or the like.

Figure 1B:
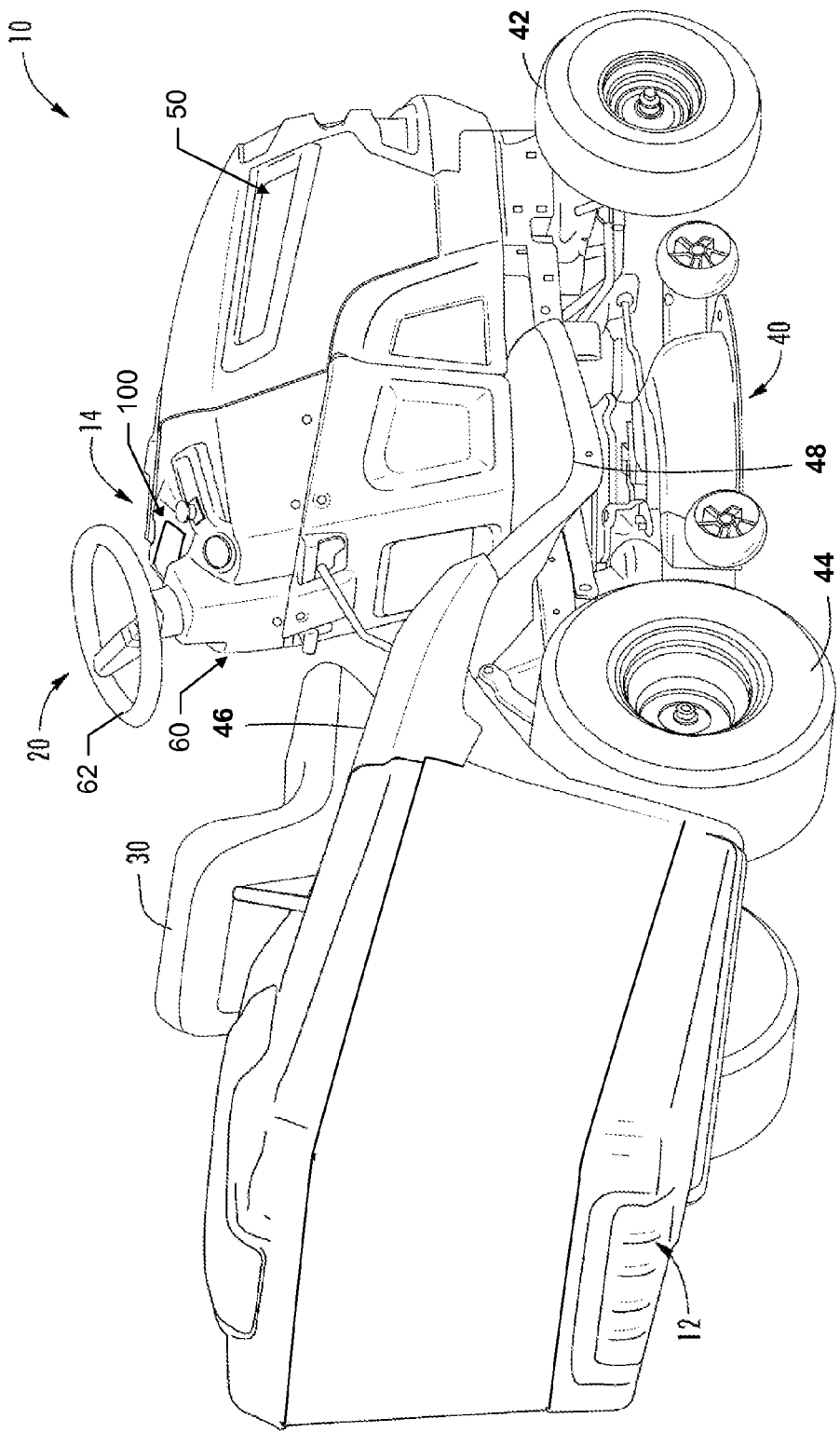
FIG. 1B illustrates a perspective view of the riding yard maintenance vehicle according to an example embodiment.

FIG. 1, which includes FIGS. 1A and 1B, illustrates an example of a riding yard maintenance vehicle 10 having a bagging attachment 12. However, it should be appreciated that example embodiments may be employed on numerous other riding yard maintenance vehicles that may not include a bagging attachment 12. The riding yard maintenance vehicle 10 may also include an information panel 14 displaying operational information regarding the riding yard maintenance vehicle 10. As shown and described herein, the riding yard maintenance vehicle 10 may be a riding lawn mower (e.g., a lawn tractor, front-mount riding lawn mower, zero-turn riding lawn mower, and/or the like). However, other example embodiments may be employed on riding yard maintenance vehicles that are configured or otherwise equipped to handle snow removal, brush cutting, tilling or other yard maintenance-related activities.

FIG. 1A illustrates a side view of the riding yard maintenance vehicle 10 and FIG. 1B illustrates a perspective view of the riding yard maintenance vehicle 10. The riding yard maintenance vehicle may include a steering assembly 20 (e.g., including a steering wheel, handle bars, or other steering apparatus) functionally connected to wheels of the riding yard maintenance vehicle 10 to which steering inputs are provided (e.g., the front and/or rear wheels in various different embodiments) to allow the operator to steer the riding yard maintenance vehicle 10. In some embodiments, the riding yard maintenance vehicle 10 may include seat 30 that may be disposed at a center, rear or front portion of the riding yard maintenance vehicle 10. The operator may sit on the seat 30, which may be disposed to the rear of the steering assembly 20 to provide input for steering of the riding yard maintenance vehicle 10 via the steering assembly 20.

The riding yard maintenance vehicle 10 may also include, or be configured to support attachment of, a cutting deck 40 having at least one cutting blade mounted therein. In some cases, a height of the at least one cutting blade may be adjustable by an operator of the riding yard maintenance vehicle 10. The cutting deck 40 may be a fixed or removable attachment in various different embodiments. Moreover, a location of the cutting deck 40 may vary in various alternative embodiments. For example, in some cases the cutting deck 40 may be positioned in front of the front wheels 42, behind the rear wheels 44, or in between the front and rear wheels 42 and 44 (as shown in FIG. 1) to enable the operator to cut grass using the at least one cutting blade when the at least one cutting blade is rotated below the cutting deck 40. In some embodiments, the front wheels 42 and/or the rear wheels 44 may have a shielding device positioned proximate thereto in order to prevent material picked up in the wheels from being ejected toward the operator. Fender 46 is an example of such a shielding device. When operating to cut grass, the grass clippings may be captured by a collection system (e.g., bagging attachment 12), mulched, or expelled from the cutting deck 40 via either a side discharge or a rear discharge.

The riding yard maintenance vehicle 10 may also include additional control related components such as one or more speed controllers, cutting height adjusters and/or the like. Some of the controllers, such as the speed controllers, may be provided in the form of foot pedals that may sit proximate to a footrest 48 (which may include a portion on both sides of the riding yard maintenance vehicle 10) to enable the operator to rest his or her feet thereon while seated in the seat 20.

In the pictured example embodiment of FIG. 1, an engine 50 of the riding yard maintenance vehicle 10 is disposed substantially forward of a seated operator. However, in other example embodiments, the engine 50 could be in different positions such as below or behind the operator. In some embodiments, the engine 50 may be operably coupled to one or more of the wheels of the riding yard maintenance vehicle 10 in order to provide drive power for the riding yard maintenance vehicle 10. In some embodiments, the engine 50 may be capable of powering two wheels, while in others, the engine 50 may power any of one to all four wheels of the riding yard maintenance vehicle 10. Moreover, in some cases, the engine 50 may manually or automatically shift between powering either two wheels or all four wheels of the riding yard maintenance vehicle 10. The engine 50 may be housed within a cover that forms an engine compartment to protect engine 50 components and improve the aesthetic appeal of the riding yard maintenance vehicle 10.

In an example embodiment, the engine compartment may be positioned proximate to and/or mate with portions of a steering assembly housing 60. The steering assembly housing 60 may house components of the steering assembly 20 to protect such components and improve the aesthetic appeal of the riding yard maintenance vehicle 10. In some embodiments, a steering wheel 62 of the steering assembly 20 may extend from the steering assembly housing 60 and a steering column (not shown) may extend from the steering wheel 62 down through the steering assembly housing 60 to components that translate inputs at the steering wheel 62 to the wheels to which steering inputs are provided.

In some embodiments, the steering assembly housing 60, the steering wheel 62 and/or the fender 46 may include gauges, displays and/or other user interface components. As such, for example, user interface components may be provided to indicate or display information to the operator regarding operational parameters related to the operation of the riding yard maintenance vehicle 10. The information may relate to any of various aspects including parameters related to cutting deck operation, engine operation, run time, work time, operator in-seat time, etc.

In an example embodiment, one or more these gauges, displays and/or other user interface components may be disposed on the information panel 14. However, in other examples, one or more of the gauges, displays or user interface components may be either fixed in their positions on the riding yard maintenance vehicle 10, rotatably mounted to the riding yard maintenance vehicle 10, or detachably coupled to the riding yard maintenance vehicle 10. In an example embodiment, the information panel 14 (or some other user interface component) may include at least a display screen 100 along with corresponding processing circuitry.

The display screen 100 may provide any of number of different gauges, displays or user interface consoles or elements on a single screen or on multiple screens that may be accessible by operator interaction. In some embodiments, the display screen 100 may be a liquid crystal display (LCD) or similar display screen. The display screen 100 may be a touch screen in some embodiments, and thus, operator instructions may be provided directly via the display screen 100. However, in other example embodiments, the display screen 110 may be accompanied by one or more function buttons that may be selected by the operator to perform any of various functions such as navigating menus and/or selecting menu items, inputting data, providing instructions, and/or the like.

The display screen 100 and corresponding processing circuitry may be powered by an internal battery, or by power generated at the riding yard maintenance vehicle 10 (e.g., via a battery or alternator thereof). The display screen 100 may, in some cases, display information related to vehicle position and/or orientation, or display information related to applications and/or services executed by the processing circuitry based on the vehicle's position and/or orientation (e.g., routing services, optimization services, maintenance related services and/or the like). In an example embodiment, the display screen 100 may be in communication with a positioning module configured to provide or facilitate the provision of the applications and/or services based on the collection of position and/or orientation information regarding the vehicle. As such, the positioning module may be configured to collect, store and/or process the information as described in greater detail below and then, in at least some embodiments, provide feedback or other output information to the display screen 100 and/or other user interface components of the riding yard maintenance vehicle 10.

Figure 2:
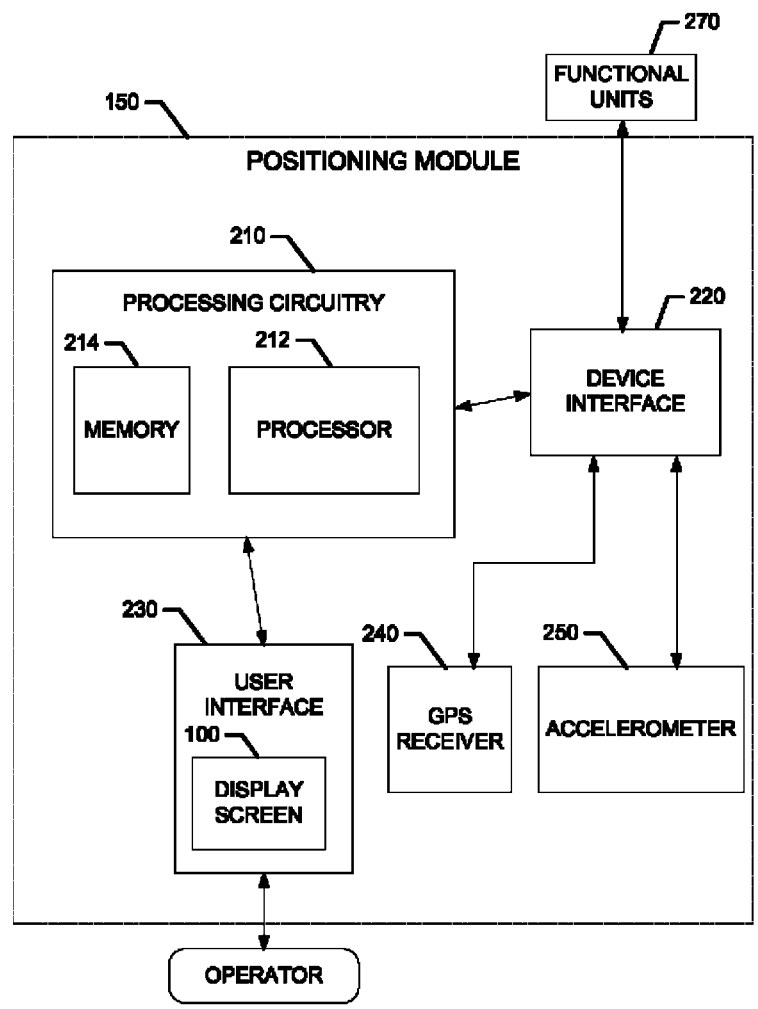
FIG. 2 illustrates a block diagram of components of a positioning module according to an example embodiment.

FIG. 2 illustrates a block diagram of various components of a positioning module 150 to illustrate some of the components that enable the functional performance of the positioning module 150 and to facilitate description of an example embodiment. In some example embodiments, the positioning module 150 may be disposed at the riding yard maintenance vehicle 10 (e.g., within the steering assembly housing 60). However, in other embodiments, the positioning module 150 (or at least portions thereof capable of analyzing and processing data using the processing circuitry 210 as described herein) may be disposed at a remote computer that may receive data from the riding yard maintenance vehicle 10. In such embodiments, the positioning module 150 may not include any sensors, but may receive any sensor data from remote sources. In an example embodiment, the positioning module 150 may include or otherwise be in communication with processing circuitry 210 that is configurable to perform actions in accordance with example embodiments described herein. As such, for example, the functions attributable to the positioning module 150 may be carried out by the processing circuitry 210.

The processing circuitry 210 may be configured to perform data processing, control function execution and/or other processing and management services according to an example embodiment of the present invention. In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 210 may include one or more instances of a processor 212 and memory 214 that may be in communication with or otherwise control a device interface 220 and, in some cases, a user interface 230. As such, the processing circuitry 210 may be embodied as a circuit chip (e.g., an integrated circuit chip) configured (e.g., with hardware, software or a combination of hardware and software) to perform operations described herein. However, in some embodiments, the processing circuitry 210 may be embodied as a portion of an on-board computer. In some embodiments, the processing circuitry 210 may communicate with electronic components and/or sensors of the riding yard maintenance vehicle 10 via a single data bus. As such, the data bus may connect to a plurality or all of the switching components and/or other electrically controlled components of the riding yard maintenance vehicle 10.

The user interface 230 (if implemented) may be in communication with the processing circuitry 210 to receive an indication of a user input at the user interface 230 and/or to provide an audible, visual, mechanical or other output to the user. As such, the user interface 230 may include, for example, a display (e.g., the display screen 100), one or more buttons or keys (e.g., function buttons), and/or other input/output mechanisms (e.g., microphone, speakers, cursor, joystick, lights and/or the like).

The device interface 220 may include one or more interface mechanisms for enabling communication with other devices (e.g., sensors of a sensor network and/or other accessories or functional units 270 such as motors, servos, switches or other operational control devices for automatic responses). In some cases, the device interface 220 may be any means such as a device or circuitry embodied in either hardware, or a combination of hardware and software that is configured to receive and/or transmit data from/to sensors in communication with the processing circuitry 210. In some example embodiments, the device interface 220 may provide interfaces for communication of components internal to the positioning module 150 (as shown in the example of FIG. 2). However, in other embodiments, components of the sensor network (e.g., including GPS receiver 240 and/or accelerometer 250) may be external to the positioning module 150 and the device interface 220 may still provide interface capabilities for interaction with such components. Automatic responses such as operational control functions that implement automatic actions to be taken responsive to detection of certain stimuli may also be provided via the device interface 220. For example, shutdown of the power take-off (PTO), stopping blade rotation, lifting the cutting deck, generating alerts or alarms relative to operation on steep slopes and/or the like, may be implemented via the provision of control signals to the functional units 270 via the device interface 220.

In embodiments employing a sensor network, the sensor network may include one or more sensors disposed at any of various locations throughout the riding yard maintenance vehicle 10 to monitor various parameters. For example, a seat sensor may be used to determine whether the operator is seated and engine sensors may determine engine parameters such as RPM or temperature. In some embodiments, one or more sensors may determine vehicle speed, blade speed, blade height, and/or the like. Sensors may also be used to determine engine run time, machine work time, and other operational parameters. In some embodiments, positioning and/or orientation sensors (e.g., global positioning system (GPS) receiver 240 and/or accelerometer 250) may receive may be included to monitor, display and/or record data regarding vehicle position and/or orientation. In this regard, for example, the GPS receiver 240 may be configured to generate data corresponding to latitude, longitude, speed, elevation, time, data and/or the like of the riding yard maintenance vehicle 10, and communicate such data to the processing circuitry 210. Meanwhile, for example, the accelerometer 250 may be configured to generate data corresponding to horizontal, vertical, and rotational accelerations of the riding yard maintenance vehicle 10, and communicate such data to the processing circuitry 210. As such, information such as pitch angle, roll angle and yaw angle may be determinable using one or more sensors of the sensor network. Data from the sensors (including the data from the GPS receiver 240, the accelerometer 250 and/or other sensors) may be fed to the processing circuitry 210 for storage, display, or for use in connection with applications that may be executed by processing circuitry 210.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the positioning module 150 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative, the memory 214 may include one or more databases that may store a variety of data sets responsive to input from the sensor network. Among the contents of the memory 214, applications may be stored for execution by the processor 212 in order to carry out the functionality associated with each respective application. In some cases, the applications may include report generation applications that utilize parametric data to generate performance related reports for consumption locally (e.g., at the display screen 100) or remotely (e.g., responsive to transfer of the data to another device or computer either wirelessly or otherwise).

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 210) may be embodied as, include or otherwise control the positioning module 150. As such, in some embodiments, the processor 212 (or the processing circuitry 210) may be said to cause each of the operations described in connection with the positioning module 150 by directing the positioning module 150 to undertake the corresponding functionalities responsive to execution of instructions or algorithms configuring the processor 212 (or processing circuitry 210) accordingly. As an example, the positioning module 150 may be configured to record position and/or orientation information, or other operational parameters regarding the tasks performed by riding yard maintenance vehicle 10 as described herein. The positioning module 150 may then, in some cases, process the information to generate alerts, warnings, route optimization, route guidance, maintenance recommendations, position histories, work histories, and/or the like.

In an example embodiment, the processing circuitry 210 may be configured to generate display views and/or screen emulations to display data gathered by the sensor network and/or to display information generated based on the data gathered by the sensor network. Alternatively or additionally, the processing circuitry 210 may be configured to generate charts or other displays to illustrate information determinable based on the data. In some embodiments, the processing circuitry 210 may process, direct display of and/or store GPS position data (e.g., as a position history), speed information, orientation information, run time, work time, engine parameters, and/or the like. Thus, for example, the processing circuitry 210 may direct storage of the data or other information generated based on the data in the memory 214. As such, the processing circuitry 210 may organize the data or information for reporting or for use in other applications that may be locally or remotely executed. For example, the processing circuitry 210 may store data for reporting to a computer executing fleet management software to manage a fleet of lawn mowers for implementation of efficient service, maintenance and operation management. In some cases, the positioning module 150 itself may be extracted from the riding yard maintenance vehicle 10 and mated with a remote network terminal or computer. The information stored on the memory 214 may then be extracted and thereby reported for fleet management or other applications. In other cases, the device interface 220 may be configured to wirelessly transmit information associated with the positioning module 150 to a remote computer to enable data processing to be accomplished on the remote computer. For example, in some cases, Bluetooth, WiFi or other wireless communication modules may be provided by the device interface 220 in order to allow wireless downloading of software, support information or other data, or allow wireless uploading of data to network devices for support, management or other purposes. In some embodiments, Bluetooth, WiFi or other short range wireless communication modules may be used to communicate data to an intermediate device (e.g., a cell phone), which may then communicate the data to a computer or other device at which certain analysis and/or display may be performed. In still other cases, a removable memory device may be used to transfer information from the memory 214 to the removable memory device and thereafter to the remote computer.

In some cases, information may also be uploaded from the remote network terminal or computer to the positioning module 150. For example, upgrading software to improve the functionality of the positioning module 150 may be uploaded. In some embodiments, software upgrading user interface capabilities, adding new sensor interface capability, and/or adding other improved functionality may be added via upload in order to upgrade the positioning module 150.

As indicated above, the positioning module 150 may be configured to store position and/or orientation data (e.g., in the memory 214). In some embodiments, the positioning module 150 may be configured to store waypoint data at regular or predefined intervals. In some cases, each waypoint stored may include only location information (e.g., latitude/longitude or other information indicative of a position relative to one or more known locations). For example, a GPS sentence (e.g., an NMEA 0183 sentence) may be recorded once each second, either alone or in combination with other data. Thus, in some other cases, each waypoint may have other information in association therewith. For example, waypoint information may include information indicative of elevation, orientation (e.g., in an x/y/z coordinate field), engine RPM, run time, work time, speed, cutting blade torque, and/or the like.

In some embodiments, the positioning module 150 may be configured to map the waypoint data in order to create route information. Thus, for example, position and/or orientation data may be stored as a position history in the form of a route. In some embodiments, the routes may be organized by geographic location (e.g., all routes associated with a certain parcel), by time/date (e.g., all routes on a particular date, starting or ending at a particular time, or within a given date/time window), by customer, or by combinations of the aforementioned along with (or without) other criteria. As such, the positioning module 150 may be able to generate route information by recording position versus time of the riding yard maintenance vehicle 10. In this regard, the positioning module 150 may essentially be enabled to trace out the path taken by the riding yard maintenance vehicle 10 during operations with respect to a particular job or series of jobs. The data may be stored as route information and, in some cases, may also be presented on the display screen 100 (or on a remote display). The presentation may be provided at any time during generation of the route, or after completion of the entire route.

Figure 3:
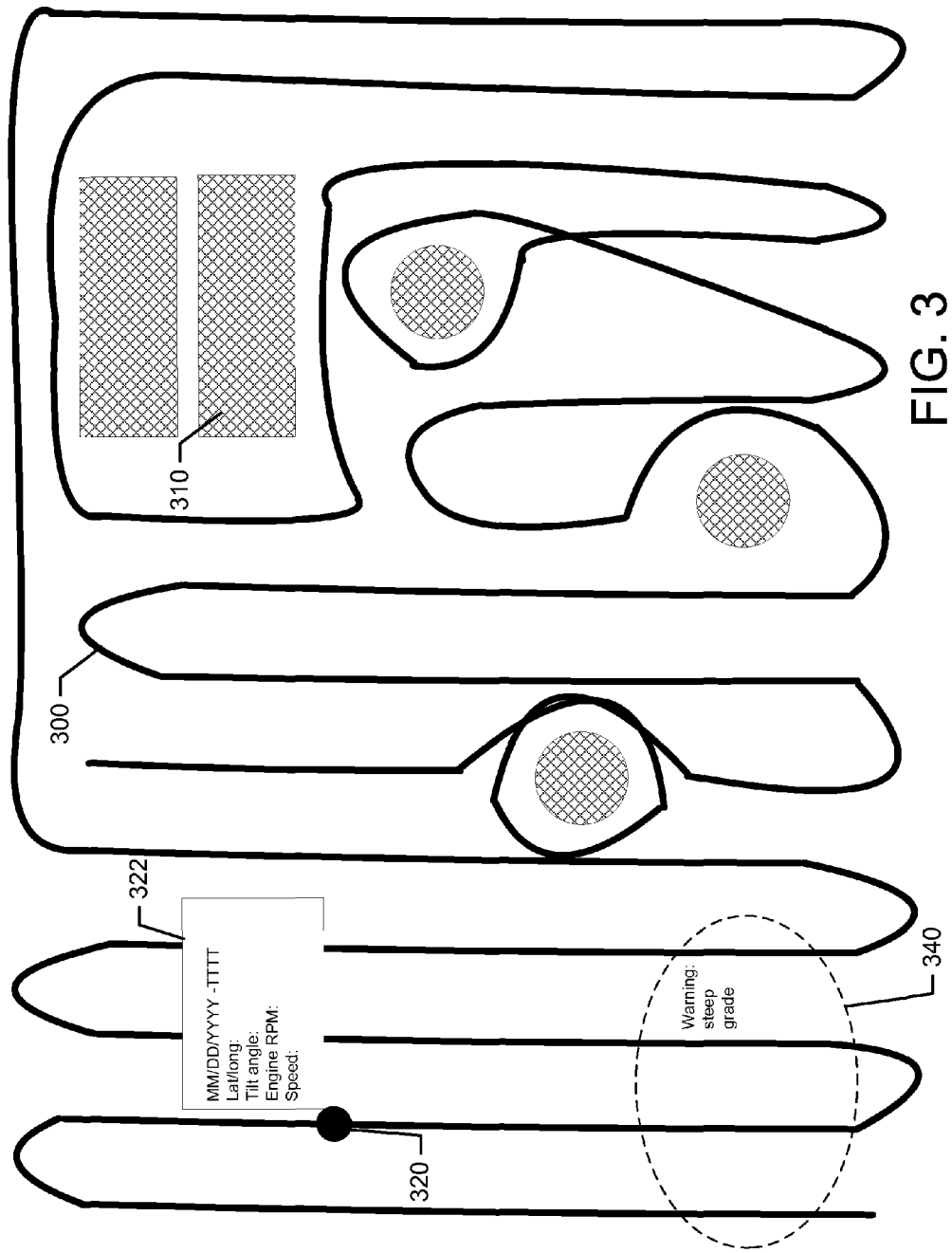
FIG. 3 illustrates a display showing an actual route of a riding yard maintenance vehicle according to an example embodiment.

FIG. 3 illustrates an example of a route 300 traced over a particular semi-rectangular parcel with some obstacles 310 positioned at various locations on the parcel. Geographic data used for providing a map view of the parcel may be generated locally or remotely by a mapping application, or may be received from a third party source. Thus, for example, a proprietary mapping application or a publicly available, online mapping application may provide data indicative of the geography of the parcel. Other potential sources may include airborne or satellite images of the parcel, topographical maps, and/or the like. The obstacles 310 may be buildings, rocks, trees, or any other structures around which the riding yard maintenance vehicle 10 must navigate to work the parcel and provide coverage of the parcel (e.g., for lawn mowing).

FIG. 3 also illustrates one waypoint (waypoint 320) and a corresponding waypoint information block 322 showing some example data. However, it should be appreciated that more waypoints could also be presented (including all waypoints in some cases), or no waypoints could be presented.

The route information may be presented as a continuous path by extrapolating riding yard maintenance vehicle 10 in between various waypoints (as shown in FIG. 3). However, in some cases, the waypoints themselves may be shown on the route 300 (e.g., as dots or other distinguishable points along the path). Furthermore, in some embodiments, the operator may be enabled to select individual ones of the waypoints in order to access information recorded in association with each respective waypoint (e.g., position, time/date, elevation, orientation, engine RPM, run time, work time, speed, cutting blade torque, and/or the like). In some embodiments, the waypoint information may also include information from other sensors such as seed, herbicide or fertilizer distribution devices to measure distribution density of various seeds or products at various locations. The operator may then be enabled to later on compare results in given areas to the conditions created in those areas in order to determine which distributions provided best results and should be repeated.

Route information corresponding to a current route or a previous route may be displayed may be displayed for operator reference while the operator is running the current route. Moreover, in some cases, both the current route and some previous route or derivative thereof may be presented simultaneously. Examples of previous or derivative routes that may be presented include an optimal route (theoretical), a best route (actual), a last route, an average route, a composite route, a selected route, and/or the like. In some embodiments, a derivative route may be considered to be any route that is not an actual route (e.g., an optimal route, an average route, a composite route of selected prior routes, etc.). In some examples, the current route could be overlaid over a previous route to show differences therebetween. Furthermore, in some cases, a position indicator corresponding to position at the same relative time from a previous route (e.g., a ghost rider) may be displayed relative to the current route so that the operator can appreciate how the progress of the current route running compares to a prior running of the same route. In an example embodiment, route guidance may be provided to the operator to guide the operator to conform to a previous route or derivative route. Alternatively or additionally, alerts, alarms or warnings may be provided as audible or visual indicators that the operator is straying from a previous route or derivative route by more than a threshold amount. The alerts may be indicated on the display or via separate lights (e.g., flashing or solid, red or yellow lights).

In some embodiments, the positioning module 150 may be configured to generate an optimal route for display to guide the operator or to inform the operator of a proposed path for working a parcel of land. The optimal route may be generated using algorithms designed to consider desirable criteria relative to performance over past routes, or relative to expected performance for a route for which detailed geographic information regarding a parcel is known a priori. As an example, the optimal route may be generated based on analyzing past routes for the time taken to complete each route and determining, based on the past routes, an optimal route for fastest completion of working a particular parcel. Alternatively, fuel economy, cut quality, blade torque minimization, risk of damage to operator or machine, tilt exposure minimization, or any number of other criteria may be used as criteria for generation of optimal routes. In some cases, the criteria used may be considered relative to a number or previous routes, or relative to models created based on vehicle performance testing, in order to generate recommendations regarding routes and/or specific driving strategies to be employed while running routes in order to optimally run the route relative to the selected criteria.

Figure 4:
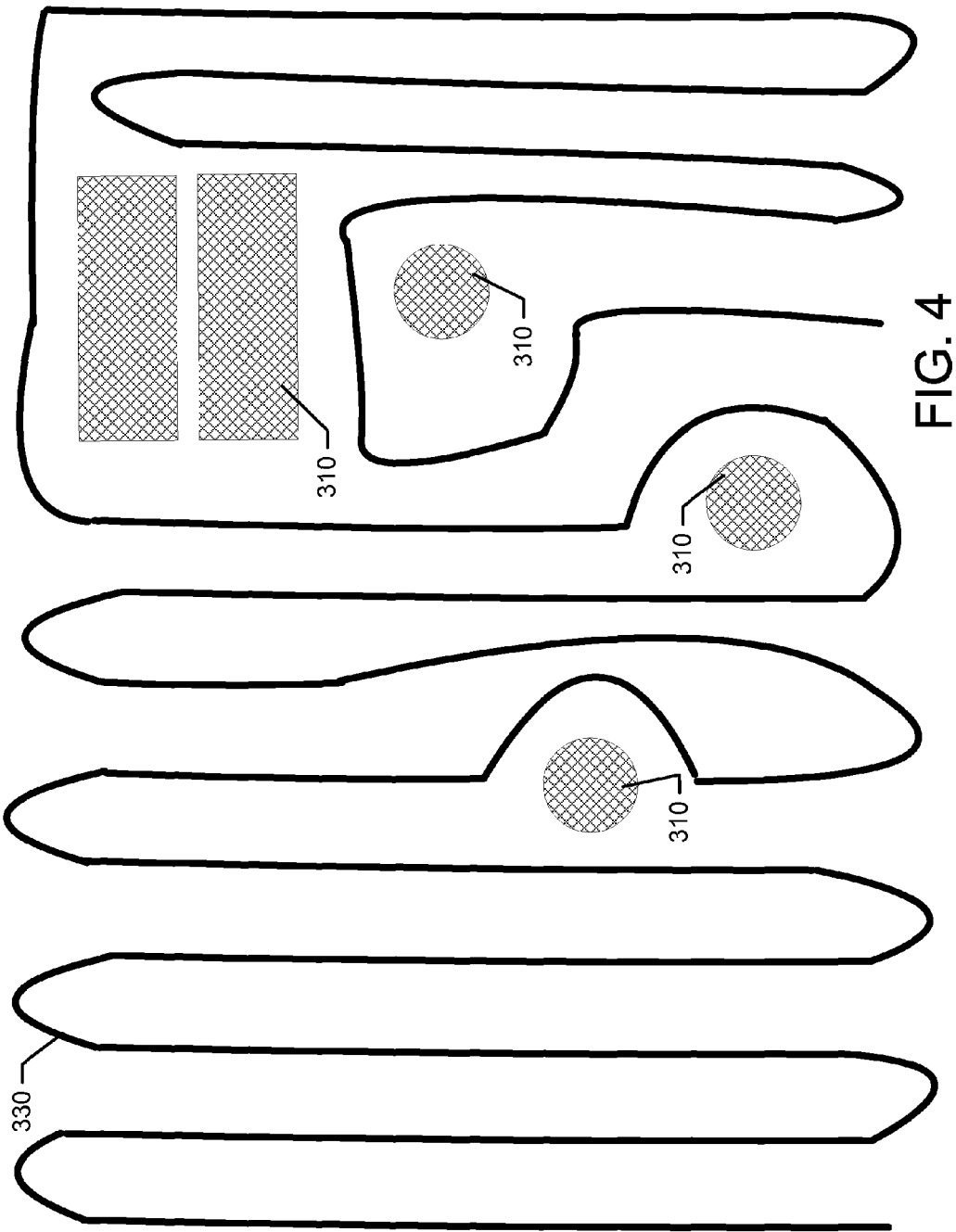
FIG. 4 illustrates a display showing a derivative route generated for provision of feedback to an operator of a riding yard maintenance vehicle according to an example embodiment.

FIG. 4 illustrates an example of an optimal route 330 that may be proposed relative to any criteria based on a previously run route (e.g., the route 300 of FIG. 3 or modeled performance). In FIG. 4 also, the parcel may be graphically displayed based on locally or remotely generated data, or based on third party data received in connection with the parcel. Moreover, in some cases, locally or remotely generated data may be merged with third party data to generate a view of the parcel with route information displayed thereon. The routes shown in FIGS. 3 and 4 (i.e., actual or optimal routes) may be provided on the display of the riding yard maintenance vehicle 10 (e.g., in embodiments where display screen 100 is provided), on the display of a remote computer (in embodiments where the positioning module 150 is embodied at least in part remotely from the riding yard maintenance vehicle 10), or may be provided by a print-out that may be generated for operator reference.

In some embodiments, the route information may be stored as data points relative to each other and/or fixed reference points (e.g., property edges or corners, or major structures). However, in some embodiments, the route information may be stored in association with map data from a mapping service (e.g., any publicly available online mapping service). Thus, for example, route information may be overlaid onto actual map data. Elevation information may be added via the accelerometer 250. However, in other examples, the map data from the mapping service may provide elevation information. Route information generated on a particular parcel or for a particular customer may have a corresponding identifier associated therewith to permit retrieval of all route information associated with the same identifier. Alternatively or additionally, the positioning module 150 may be enabled to recognize and/or associate data gathered relative to the same general region within the context of route information stored in connection with map data from a mapping service. Thus, any route information stored in connection with a particular area or set of general coordinates on a map may be associated with other route information stored in connection the same particular area or set of general coordinates. As such, for example, when the positioning module 150 receives GPS data identifying a location of the riding yard maintenance vehicle 10 prior to or during running of a route, the previously stored route information associated with the location may automatically be indicated (e.g., in list format by date) to the user to enable the user to select prior routes for comparison or derivative route generation (e.g., route optimization, average route determination, and/or the like).

In some embodiments, the positioning module 150 may be further configured to provide services related to processing of elevation information corresponding to a particular route. For example, elevation information or other data indicative of natural structures (e.g., hills, valleys, ravines, and/or the like), man-made structures, obstacles or hazards may be used to assess risk factors associated with operating in certain areas and such risk factors may be identified via audible and/or visual alerts. As an example, if a hill or ditch has a steep slope that would present a rollover risk if approached the wrong way (e.g., sideways instead of straight on), such areas may be identified as tilt exposure risk areas on a map view or other display showing route information. In some embodiments, the tilt exposure risk may also be used to trigger process interventions. For example, if tilt as indicated by the accelerometer 250 reaches a predefined level, the positioning module 150 may be configured to stop providing driving power to a blade motor that drives the cutting blade or blades within the cutting deck 40 or to a drive motor that provides power to the wheels. In some embodiments, warnings may be issued instead of or prior to initiation of any process interventions. Tilt may also or alternatively present risks relative to machine integrity or maintenance. For example, riding at the same angle for a long period of time may concentrate oil to one side of the crankcase and impact engine wear. Thus, the positioning module 150 may configured to track the amount of time that the riding yard maintenance vehicle 10 spends at a particular angle (or angles above a threshold) and issue a warning when the amount of time exceeds a predetermined amount. In some cases, speed restricted areas (e.g., based on slope or obstacle frequency) may also be identified to the operator as area with increased risk exposure. Areas that present risks above a certain threshold may be identified with overlaid graphics, color shading or any other suitable distinguishing characteristics on a map view or as a highlighted portion of a route. FIG. 3 illustrates an example of a risk-related regional alert 340 that is indicative of a risk being associated with the highlighted region.

Although external mapping services may provide relatively easily accessible map data that may show 2D or even 3D views of a parcel to be worked, it should also be appreciated that the positioning module 150 may map parcels itself in some embodiments. In such embodiments, for example, the operator may provide an identifier for a parcel or customer and initiate mapping while defining a route. The route information may be stored and/or displayed as a collection of waypoints or positions relative to one another, one or more fixed reference points, or in terms of latitude and longitude. In some cases, the route information may further include elevation and/or tilt information (e.g., from the accelerometer 250) that may be used to generate a map of the elevation of the parcel being worked. After working of the parcel is complete, the route information may be saved in connection with the corresponding parcel or customer as one instance of a route run on the corresponding parcel. Thereafter, the operator may be enabled to enter the identifier and retrieve route information for the corresponding parcel or customer. Alerts, warnings, route optimization and other services, such as those described herein by way of example, may further be provided relative to self mapped route information.

The recordation of position and/or orientation data for the riding yard maintenance vehicle 10 may provide a number of uses to operators. As indicated above, route optimization services, route guidance services, and the provision of alerts and warnings may all be provided based on the storage of route information including position and/or orientation data. However, the knowledge of past routes may also provide a number of other uses. For example, variation of the orientation of lawn striping may be easily accomplished (e.g., in a guided or unguided format) by informing the operator of the orientation of previous striping. Accordingly, the operator does not need to try to remember the way a parcel was worked on a previous occasion. Such recorded information may also be useful for billing purposes in a commercial setting. For example, the work time may be easily determined, or the fact that a particular parcel was worked may be evidenced from the stored data. Machine utilization planning may also be enhanced. For example, maintenance may be planned based on recordation of hours worked, indications regarding exposure to tilt, or other such data. Operator effectiveness and evaluation may also be performed based on the recorded data. As such, operators that are inefficient may be identified and trained or disciplined. In some embodiments, storage of operating data may also be used as a form of "flight data recorder" or "black box" relative to operation of the riding yard maintenance vehicle 10 prior to an incident. For example, if an accident or incident occurs and machine or operator activity comes into question, the recordation of data as described herein leading up to the accident or incident may provide an opportunity for study of machine versus operator contribution to the events that occurred. In some cases, a predetermined amount of information (e.g., in a circular buffer) may be recorded such that a fixed amount of the most recent data indicative of machine or operator activity may be stored for study in the event that an incident or accident occurs.

Figure 5:
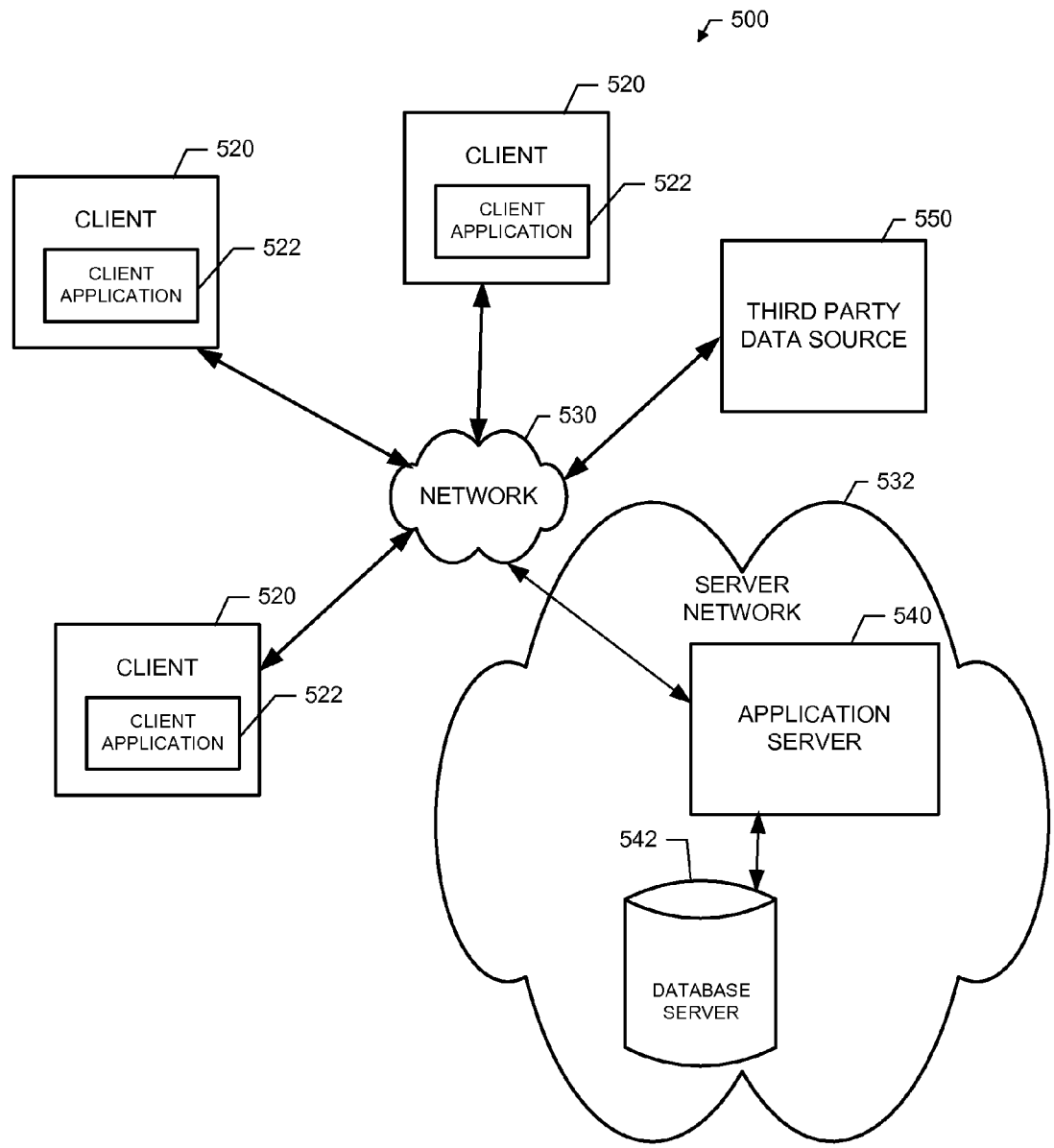
FIG. 5 illustrates a system in which an embodiment of the present invention may be employed according to an example embodiment.

Thus, for example, one or more vehicles may transit over a route or parcel and record and process data locally for use as described above. However, in some embodiments, one or more vehicles may transit over a route or parcel and record or otherwise transmit data in order to provide reporting data to a central facility. The central facility may record the route information associated with the corresponding route or parcel and the recorded information for the respective route or parcel may thereafter be processed for various purposes and/or accessed by another riding yard maintenance vehicle for providing mapping services or other functions to the operator of the other riding yard maintenance vehicle. A number of fleet management services may also be provided such as billing management, merging data with third party mapping sources, generation of 3D topographical maps of parcels, and/or the like. FIG. 5 illustrates an example network structure via which such an example embodiment may be practiced.

In this regard, FIG. 5 illustrates a system in which an embodiment of the present invention may be employed by processing of data at a central facility (e.g., application server 540). Thus, for example, although the apparatus of FIG. 2 may be embodied at a yard maintenance vehicle itself, in other embodiments such an apparatus may alternatively or additionally be located at a central facility or server. As shown in FIG. 5, a system 500 according to an example embodiment may include one or more clients 520 that may, in some cases, be associated with different corresponding riding yard maintenance vehicles or other remote nodes. For example, among the clients 520, one client may be associated with the riding yard maintenance vehicle 10 and a second client may be associated with a smart phone or other mobile communication device, while a third client may be associated with a computer (e.g., of the operator of the riding yard maintenance vehicle 10 or of a fleet manager of the fleet to which the riding yard maintenance vehicle 10 belongs). The nodes (and the corresponding clients) may be associated with the same individual or organization or the nodes could be associated with different individuals or organizations. As such, in some cases, multiple clients may be associated with the same or different organizations. Furthermore, although different types of possible hosts for the clients 520 are mentioned above, the hosts need not necessarily be different. As such, each one of the clients 520 may be, for example, a computer (e.g., a personal computer, laptop computer, network access terminal, or the like) or may be another form of computing device (e.g., a personal digital assistant (PDA), cellular phone, smart phone, or the like) capable of communication with a network 530 via any short range (e.g., WiFi, Bluetooth, etc.) or long range communication protocols (e.g., 3G, 4G, LTE, etc.). As such, the clients 520 may be fixed at or integrated into riding yard maintenance vehicles, may be removable or transferable accessories or components associated with riding yard maintenance vehicles, or may be separate devices (e.g., a smart phone) capable of running applications useable in connection with operation of riding yard maintenance vehicles.

In some cases, each one of the clients 520 may include (or otherwise have access to) memory for storing instructions or applications for the performance of various functions and a corresponding processor for executing stored instructions or applications. Each one of the clients 520 may also include software and/or corresponding hardware for enabling the performance of the respective functions of the clients as described herein in relation to recording (or providing information for remote recording) of information indicative of vehicle position and/or orientation. In an example embodiment, one or more of the clients 520 may include a client application 522 configured to operate in accordance with an example embodiment of the present invention. In this regard, for example, the client application 522 may include software for enabling a respective one of the clients 520 to communicate with the network 530 for requesting and/or receiving information indicative of vehicle position and/or orientation in the context of a route or parcel in the form of a deliverable component (e.g., as downloadable software to configure the client, or as a transferable memory device including instructions to configure the client). As such, for example, the client application 522 may include corresponding executable instructions for configuring the client 520 to provide corresponding functionalities as described in greater detail herein.

The network 530 may be a data network, such as a local area network (LAN), a metropolitan area network (MAN), a wide area network (WAN) (e.g., the Internet), and/or the like, which may couple the clients 520 to devices such as processing elements (e.g., personal computers, server computers or the like) or databases. Communication between the network 530, the clients 520 and the devices or databases (e.g., servers) to which the clients 520 are coupled may be accomplished by either wireline or wireless communication mechanisms and corresponding protocols.

In an example embodiment, one of the devices to which the clients 520 may be coupled via the network 530 may include one or more application servers (e.g., application server 540), and/or a database server 542, which together may form respective elements of a server network 532. Although the application server 540 and the database server 542 are each referred to as "servers," this does not necessarily imply that they are embodied on separate servers or devices. As such, for example, a single server or device may include both entities and the database server 542 could merely be represented by a database or group of databases physically located on the same server or device as the application server 540. The application server 540 and the database server 542 may each include hardware and/or software for configuring the application server 540 and the database server 542, respectively, to perform various functions. As such, for example, the application server 540 may include processing logic and memory enabling the application server 540 to access and/or execute stored computer readable instructions for performing various functions. In an example embodiment, one function that may be provided by the application server 540 may be the identification of, the recording of and/or receiving of information indicative of vehicle position and/or orientation in the context of a route or parcel. Alternatively or additionally, the function may include generating maps of parcels, merging position information recorded with geographic data from other sources (e.g., Google Earth, image data, topographical data, and/or the like).

In an example embodiment, the application server 540 may include or have access to memory (e.g., internal memory or the database server 542) for storing instructions or applications for the performance of various functions and a corresponding processor for executing stored instructions or applications. For example, the memory may store an instance of the position module 150 configured to operate in accordance with an example embodiment of the present invention. In this regard, for example, the position module 150 may be embodied at the application server 540 and may include software for enabling the application server 540 to communicate with the network 530 and/or the clients 520 for the provision and/or receipt of information indicative of vehicle position and/or orientation or the performance of other functions as described herein.

In some embodiments, a third party data source 550 may be accessible via the network 530 in order to provide third party geographic data to the clients 520 and/or the application server 540 for merging with locally or remotely generated data, or for providing data for generation of map views on which obstacle locations may be provided. As indicated above, the third party geographic data may include maps, images, or other representations of parcels, lots or other geographic regions for which obstacle location identification may be desirable.

As such, the environment of FIG. 5 illustrates an example in which provision of recorded obstacle locations to an onsite device (e.g., the riding yard maintenance vehicle 10 or a mobile phone or device of the operator of the riding yard maintenance vehicle 10) may be accomplished by a remote entity (e.g., the application server 540). As such, the onsite device may be enabled to generate or utilize map or other geographic data even if the onsite device did not necessarily record some of the data itself. Moreover, in some embodiments, provision of location information may be provided from the onsite device to the remote entity for recording and later provision of such data, or of functions driven off of such data, either to the onsite device or another device that ends up at the same site in the future.

Embodiments of the present invention may therefore be practiced using an apparatus such as the one depicted in FIG. 2. However, other embodiments may be practiced in connection with a computer program product for performing embodiments of the present invention. As such, for example, each block or step of the flowcharts of FIGS. 6-9, and combinations of blocks in the flowcharts, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device (e.g., memory 214) and executed by processing circuitry (e.g., processor 212).

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s) or step(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s). In this regard, a method according to example embodiments of the invention may include any or all of the operations shown in FIGS. 6-9. Moreover, other methods derived from the descriptions provided herein may also be performed responsive to execution of steps associated with such methods by a computer programmed to be transformed into a machine specifically configured to perform such methods.

Figure 6:
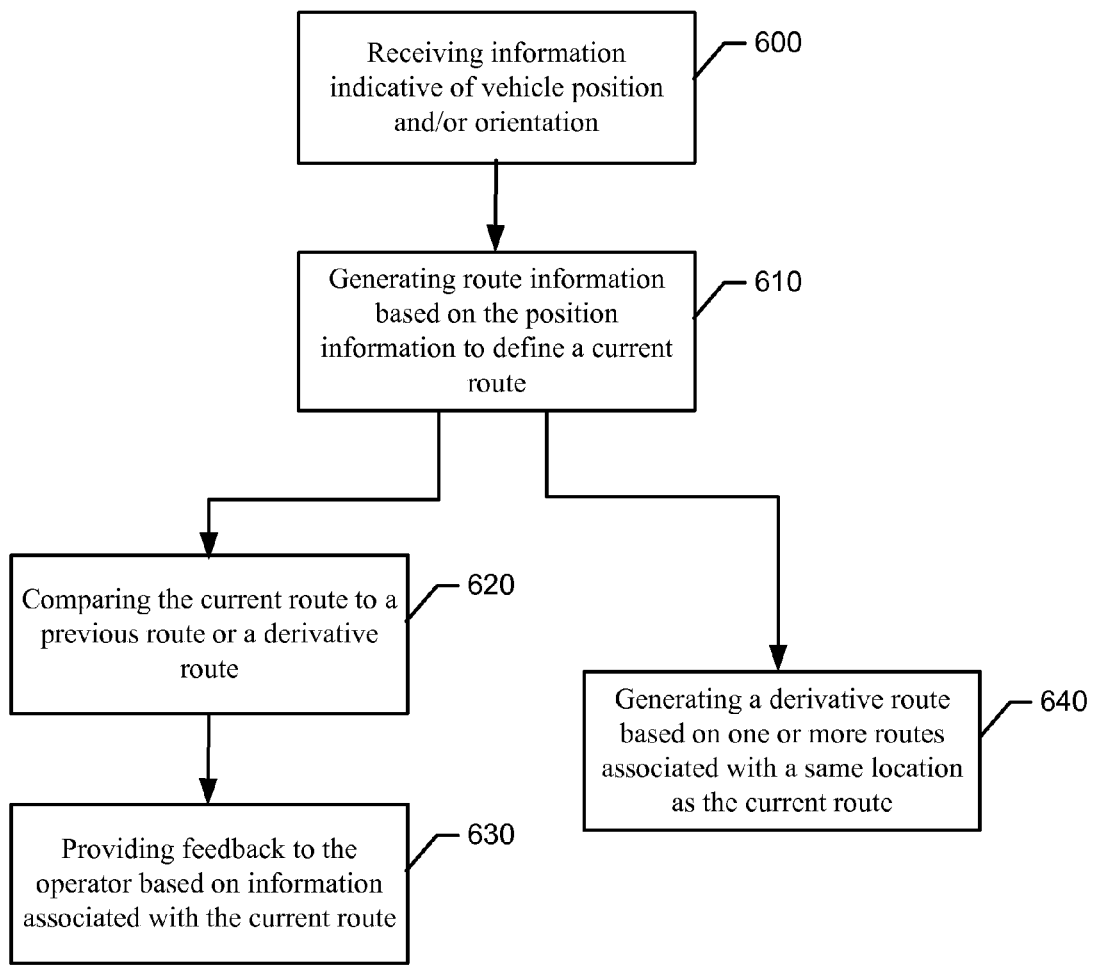
FIG. 6 illustrates a block diagram of a method according to an example embodiment.

In an example embodiment, a method for processing position information of a riding yard maintenance vehicle, as shown in FIG. 6, may include receiving information indicative of vehicle position and/or orientation at operation 600 and generating route information based on the position information to define a current route at operation 610. The method may further include comparing the current route to a previous route or a derivative route at operation 620 and providing feedback to the operator based on information associated with the current route at operation 630. The feedback may be guidance related, may be a visual representation of the current route and/or the derivative route, may include alerts or warnings, may include a map view, may include waypoints and data associated with the waypoints, or any of a number of other visual or audible feedback queues. In some cases, the method may include (in addition to or as an alternative to operation 620) generating a derivative route based on one or more routes associated with a same location as the current route at operation 640.

In an example embodiment, an apparatus for performing the method of FIG. 6 above may comprise a processor (e.g., the processor 212) configured to perform some or each of the operations (600-640) described above. The processor 212 may, for example, be configured to perform the operations (600-640) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 600-640 may comprise, for example, the positioning module 150. Additionally or alternatively, at least by virtue of the fact that the processor 212 may be configured to control or even be embodied as the positioning module 150, the processor 212 and/or a device or circuitry for executing instructions or executing an algorithm for processing information as described above may also form example means for performing operations 600-640.

Figure 7:
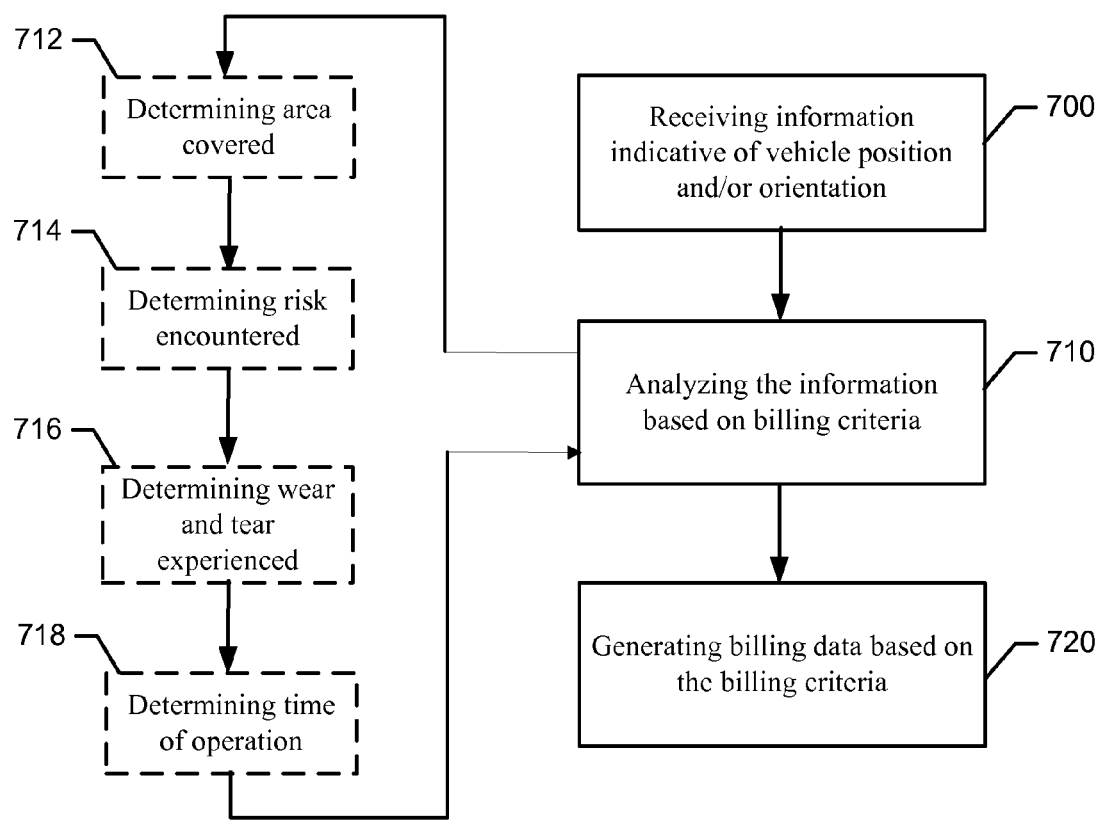
FIG. 7 illustrates a block diagram of another method according to an example embodiment.

In another example embodiment, a method for processing position information of a riding yard maintenance vehicle for billing purposes, as shown in FIG. 7, may include receiving information indicative of vehicle position and/or orientation at operation 700 and analyzing the information based on billing criteria at operation 710. The billing criteria may include rules relating conditions detected relative to the vehicle position and/or orientation to corresponding costs to be accrued. For example, the information may be used to determine area covered on a parcel or job, time spent on a parcel or job, wear and tear experienced by the vehicle on a parcel or job, risks encountered by the vehicle on a parcel or job, and/or the like. Factors such as risk or wear and tear may be determinable based on algorithms generated to factor in the degree and time of exposure to angles, slopes or other unusual or potentially hazardous conditions to a corresponding amount of risk or wear and tear. As such, operation 710 may, in various different embodiments, include one or more of the sub-operations shown in FIG. 7 such as determining area covered at operation 712, determining risk encountered at operation 714, determining wear and tear experienced at operation 716, and determining time of operation at operation at operation 718. The method may further include generating billing data based on the billing criteria at operation 720.

In an example embodiment, an apparatus for performing the method of FIG. 7 above may comprise a processor (e.g., the processor 212) configured to perform some or each of the operations (700-720) described above. The processor 212 may, for example, be configured to perform the operations (700-720) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 700-720 may comprise, for example, the positioning module 150. Additionally or alternatively, at least by virtue of the fact that the processor 212 may be configured to control or even be embodied as the positioning module 150, the processor 212 and/or a device or circuitry for executing instructions or executing an algorithm for processing information as described above may also form example means for performing operations 700-720.

Figure 8:
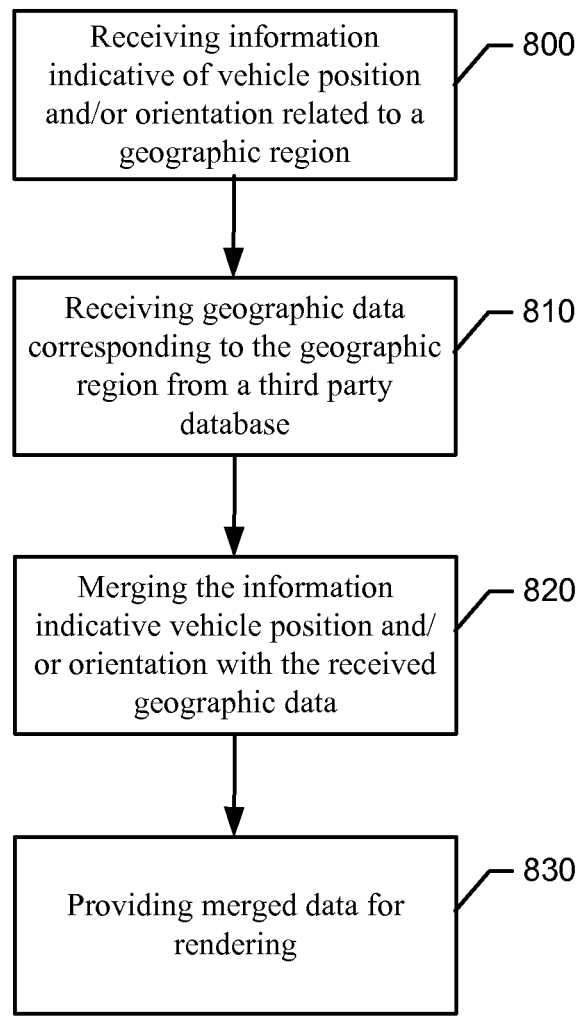
FIG. 8 illustrates a block diagram of yet another method according to an example embodiment.

In another example embodiment, a method for merging position information of a riding yard maintenance vehicle with external geographic data, as shown in FIG. 8, may include receiving information indicative of vehicle position and/or orientation related to a geographic region at operation 800 and receiving geographic data corresponding to the geographic region from a third party database at operation 810. The method may further include merging the information indicative vehicle position and/or orientation with the received geographic data at operation 820. In some embodiments, the method may further include providing merged data for rendering at operation 830.

In an example embodiment, an apparatus for performing the method of FIG. 8 above may comprise a processor (e.g., the processor 212) configured to perform some or each of the operations (800-830) described above. The processor 212 may, for example, be configured to perform the operations (800-830) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 800-830 may comprise, for example, the positioning module 150. Additionally or alternatively, at least by virtue of the fact that the processor 212 may be configured to control or even be embodied as the positioning module 150, the processor 212 and/or a device or circuitry for executing instructions or executing an algorithm for processing information as described above may also form example means for performing operations 800-830.

Figure 9:
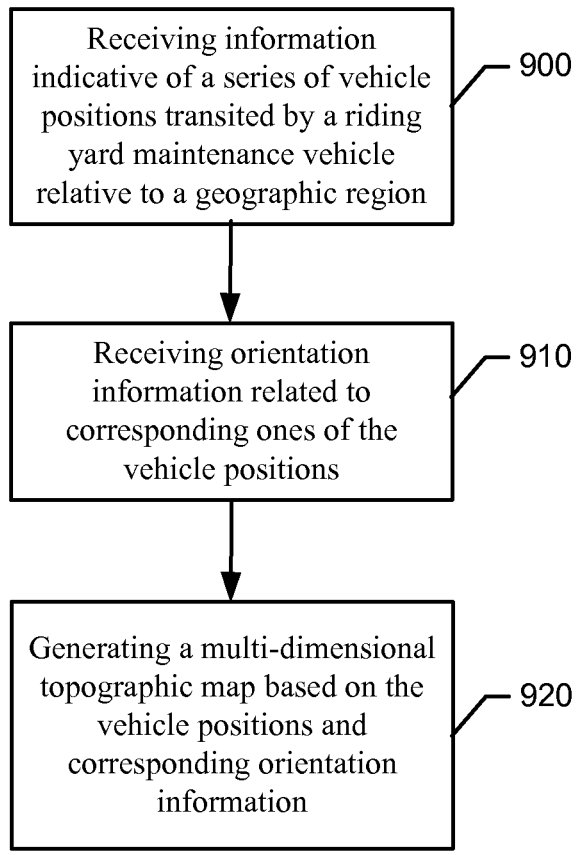
FIG. 9 illustrates a block diagram of a method according to an example embodiment.

In another example embodiment, a method for generating map data based on position information provided by a riding yard maintenance vehicle, as shown in FIG. 9, may include receiving information indicative of a series of vehicle positions transited by a riding yard maintenance vehicle relative to a geographic region at operation 900. The method may further include receiving orientation information related to corresponding ones of the vehicle positions at operation 910. In some embodiments, the method may further include generating a multi-dimensional topographic map based on the vehicle positions and corresponding orientation information at operation 920.

In an example embodiment, an apparatus for performing the method of FIG. 9 above may comprise a processor (e.g., the processor 212) configured to perform some or each of the operations (900-920) described above. The processor 212 may, for example, be configured to perform the operations (900-920) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 900-920 may comprise, for example, the positioning module 150. Additionally or alternatively, at least by virtue of the fact that the processor 212 may be configured to control or even be embodied as the positioning module 150, the processor 212 and/or a device or circuitry for executing instructions or executing an algorithm for processing information as described above may also form example means for performing operations 900-920.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A riding yard maintenance vehicle comprising:
 a positioning module configured to store position information indicative of a position history of the vehicle responsive to operation of the vehicle defining a route, the positioning module comprising:
  a user interface,
  a memory for storing data received via one or more sensors, and
  processing circuitry in communication with the user interface and the memory, the processing circuitry being configured to control operation of the positioning module and generate feedback via the user interface, the feedback being provided to an operator based on the position information,
  wherein the processing circuitry is configured to generate the feedback as a visual display of progress on a current route being executed by the vehicle relative to route information corresponding to a previous route executed by the vehicle.

2. The riding yard maintenance vehicle of claim 1, wherein the processing circuitry is configured to generate the feedback as a visual display of the current route.

3. The riding yard maintenance vehicle of claim 1, wherein the processing circuitry is configured to generate the feedback as an alert to the operator relative to at least a portion of the current route.

4. The riding yard maintenance vehicle of claim 1, wherein the processing circuitry is configured to generate the feedback as an optimal route generated with respect to operator selected criteria.

5. The riding yard maintenance vehicle of claim 1, wherein the processing circuitry is configured to generate the feedback as guidance information associated with conforming the current route to the previous route or a derivative route.

6. The riding yard maintenance vehicle of claim 1, wherein the processing circuitry is configured to receive map data from an online mapping service and associate the position information with the map data.

7. The riding yard maintenance vehicle of claim 1, wherein the processing circuitry is configured to generate map data locally based on position and elevation changes experienced while traversing the current route.

8. The riding yard maintenance vehicle of claim 1, wherein the processing circuitry is further configured to generate route information based on orientation information received from the one or more sensors.

9. The riding yard maintenance vehicle of claim 8, wherein the processing circuitry is configured to generate an alert to the operator based on the orientation information.

10. The riding yard maintenance vehicle of claim 1, wherein the processing circuitry is configured to provide for display of the current route and at least a portion of a suggested route simultaneously.

11. The riding yard maintenance vehicle of claim 1, wherein the processing circuitry is configured to provide for display of at least one waypoint of the current route.

12. The riding yard maintenance vehicle of claim 11, wherein the processing circuitry is configured to provide for display of time, date, engine data, position, orientation, and speed of the vehicle at the at least one waypoint.

13. The riding yard maintenance vehicle of claim 1, wherein the processing circuitry is further configured to generate billing information based at least in part on the position information.

14. A positioning module configured to process position information indicative of a position history of a riding yard maintenance vehicle responsive to operation of the vehicle defining a route, the positioning module comprising:
   a user interface;
   a memory for storing data received via one or more sensors of the vehicle; and
   processing circuitry in communication with the user interface and the memory, the processing circuitry being configured to control operation of the positioning module and generate feedback via the user interface, the feedback being provided to an operator based on the position information,
   wherein the processing circuitry is configured to generate the feedback as a visual display of progress on a current route being executed by the vehicle relative to route information corresponding to a previous route executed by the vehicle.

15. The positioning module of claim 14, wherein the positioning module is disposed on the riding yard maintenance vehicle.

16. A method comprising:
   receiving information indicative of vehicle position and orientation of a riding yard maintenance vehicle responsive to operation of the vehicle;
   generating, via processing circuitry, route information based on the information received to define a current route being executed by the vehicle; and
   providing feedback to the operator based on information associated with the current route,
   wherein the feedback comprises at least a visual display of progress on the current route relative to route information corresponding to a previous route executed by the vehicle.

17. The method of claim 16, further comprising generating a derivative route based on one or more routes associated with a same location as the current route.

18. The method of claim 16, further comprising merging the information indicative of vehicle position and orientation with geographic data received from a third party source.

19. The method of claim 16, further comprising generating a multi-dimensional topographic map based on the information indicative of vehicle position and orientation.

* * * * *